Jan. 7, 1958   R. M. CARRIER, JR   2,818,968
SPIRAL AND LIKE CONVEYORS
Filed May 21, 1954   5 Sheets-Sheet 1

INVENTOR.
ROBERT M. CARRIER, JR.
BY
Oberlin & Limbach
ATTORNEYS

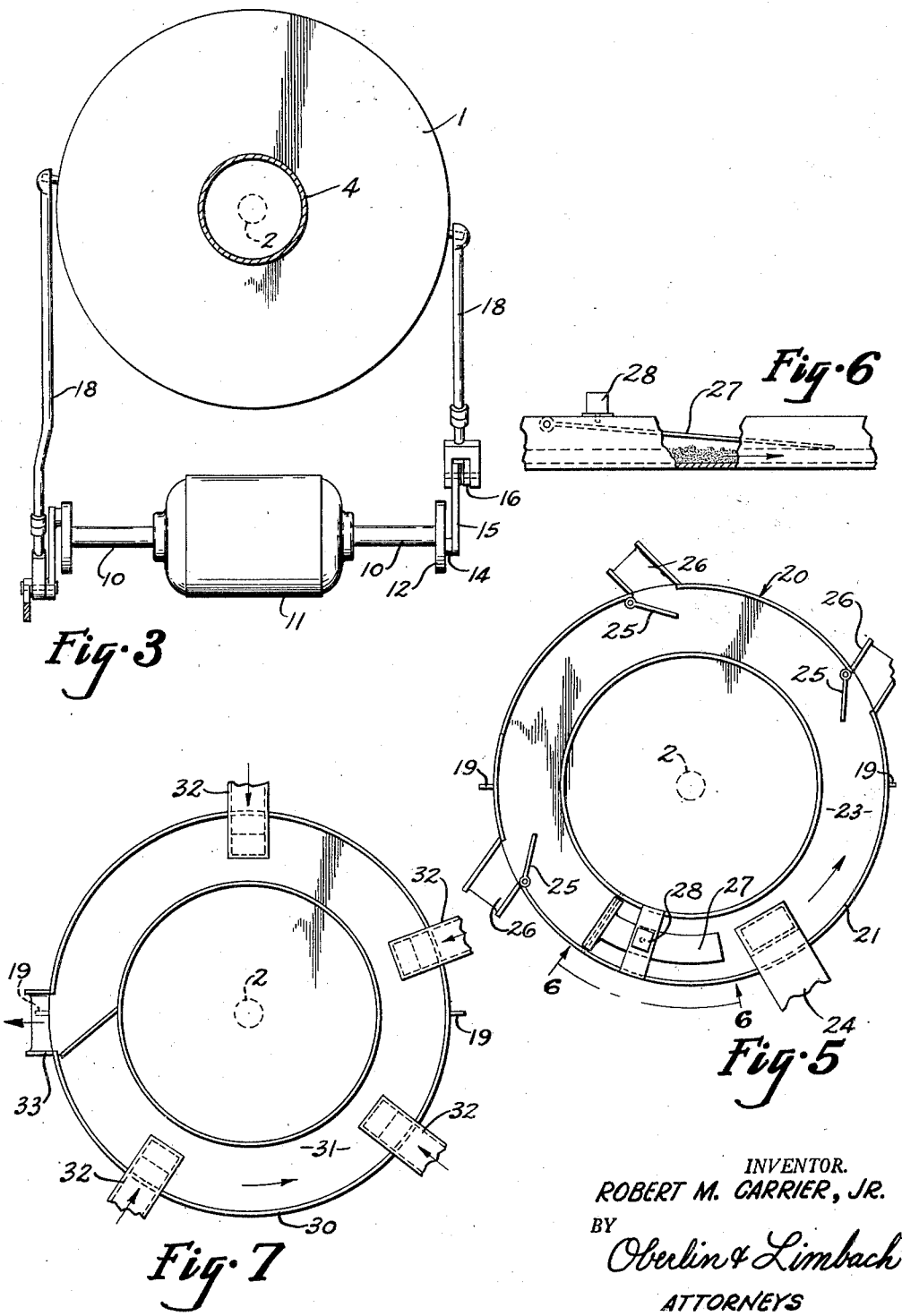

Jan. 7, 1958     R. M. CARRIER, JR     2,818,968
SPIRAL AND LIKE CONVEYORS
Filed May 21, 1954     5 Sheets-Sheet 3
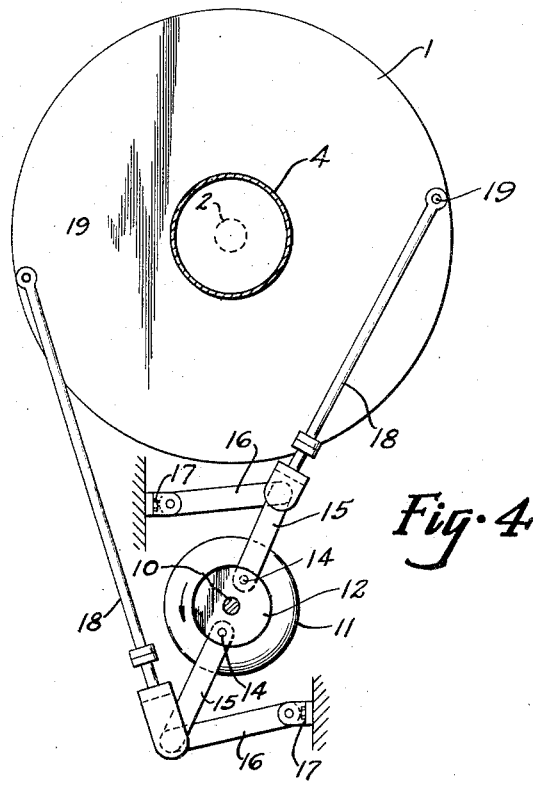
INVENTOR.
ROBERT M. CARRIER, JR.
BY
Oberlin & Limbach
ATTORNEYS

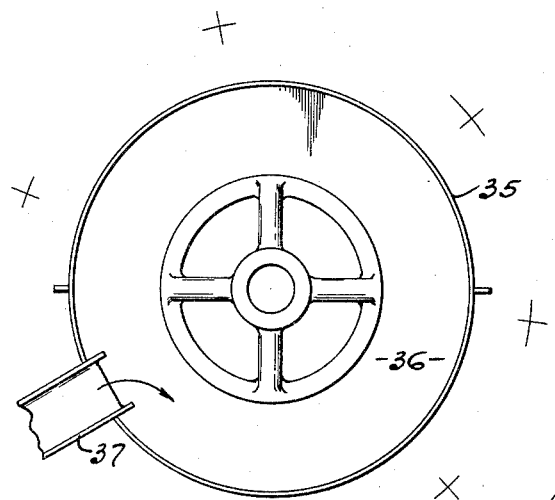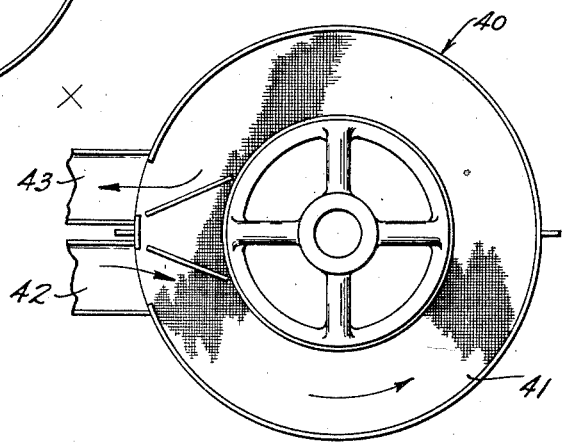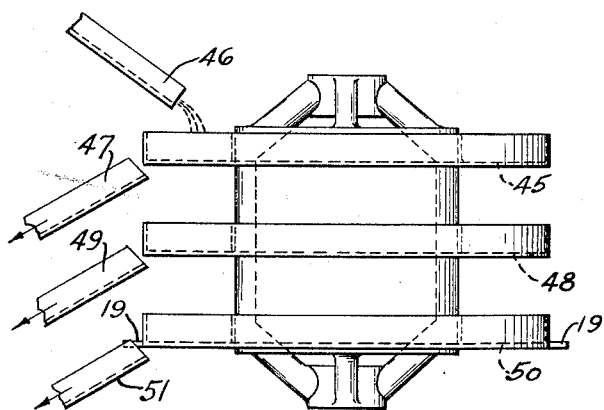

Jan. 7, 1958 R. M. CARRIER, JR 2,818,968
SPIRAL AND LIKE CONVEYORS
Filed May 21, 1954 5 Sheets-Sheet 5

INVENTOR.
ROBERT M. CARRIER, JR.
BY
Oberlin & Limbach
ATTORNEYS

United States Patent Office 2,818,968
Patented Jan. 7, 1958

2,818,968

SPIRAL AND LIKE CONVEYORS

Robert M. Carrier, Jr., Louisville, Ky., assignor to Carrier Conveyor Corporation, Louisville, Ky., a corporation of Kentucky Application May 21, 1954, Serial No. 431,566

8 Claims. (Cl. 198—220)

The present invention relates to a structure which is designed to be oscillated about a generally vertical axis to convey material along its circular, helical, or similarly curved material supporting surface, to screen material thereon, to mix or blend material thereon while being conveyed or transported therearound, and to convey material supplied thereto at a loading zone for distribution to several discharge zones therearound. More particularly, the present invention relates to structures of the character indicated in which the material is moved along a longitudinally curved path, and in the case of conveying, the curved path is preferably, but not necessarily, of helical or spiral form effective to convey the material thereon upwardly or downwardly therealong.

Hitherto, in a vertical spiral and like conveyor, the same is usually vibrated along an inclined arcuate path which includes vertical and horizontal components, whereby the conveyable material thereon is tossed or directionally thrown angularly with respect to the material supporting helical surface, and in this way the material is advanced lengthwise of the curved (and also inclined, in the case of a spiral conveyor) material supporting surface.

One of the principal objects of this invention is to provide a structure of the character indicated and drive means therefor which imparts to the structure a rotary oscillation in a horizontal plane about a generally vertical axis to thus eliminate vertical components and consequent bearing complications and the necessity of alternately raising and lowering of the structure and load of material thereon.

It is another object of this invention to provide a structure of the character indicated in which the structure support and drive means are much simpler and easier to make, install, and maintain than presently known vibrating structures of the character indicated.

Because the dead weight of the present structure is not alternately lifted and lowered, it may be made strong and rigid for handling large amounts of heavy material.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 3 is a horizontal cross-section view taken substantially along the line 3—3, Fig. 1;

Fig. 4 is a cross-section view similar to Fig. 3 except illustrating a conveyor oscillating mechanism which has a vertical drive shaft parallel to the vertical axis of the conveyor;

Fig. 5 is a top plan view, somewhat schematic in nature, illustrating the application of the principles of this invention to a distributing table effective to distribute material supplied thereonto to a plurality of circumferentially spaced points around the table;

Fig. 6 is a fragmentary side elevation, on somewhat enlarged scale, as viewed substantially along the line 6—6, Fig. 5;

Fig. 7 is a top plan view of a mixing or blending table according to the principles of this invention wherein different materials in desired amounts are supplied to the table for discharge therefrom at a common discharge for subsequent mixing;

Fig. 8 is a top plan view of a sorting table onto which a variety of different materials or parts are adapted to be supplied, so that workmen stationed at several points around the table may select the parts or materials which they require, such as bolts, nuts, washers, etc.;

Fig. 9 is a top plan view of an oscillated screen table to which material is supplied at one point, and from which such material larger than the screen mesh is discharged at another point; and, of course, the fine particles which do pass through the screen may be collected therebelow or conveyed therefrom to some other point of use or storage;

Fig. 10 is a side elevation view of a multiple screen deck structure herein shown as comprising three screen decks, the largest mesh screen of which is at the top, the finest at the bottom, and the intermediate in between, there being discharge troughs or the like to discharge the material which does not pass through the respective screen decks;

Figure 1:
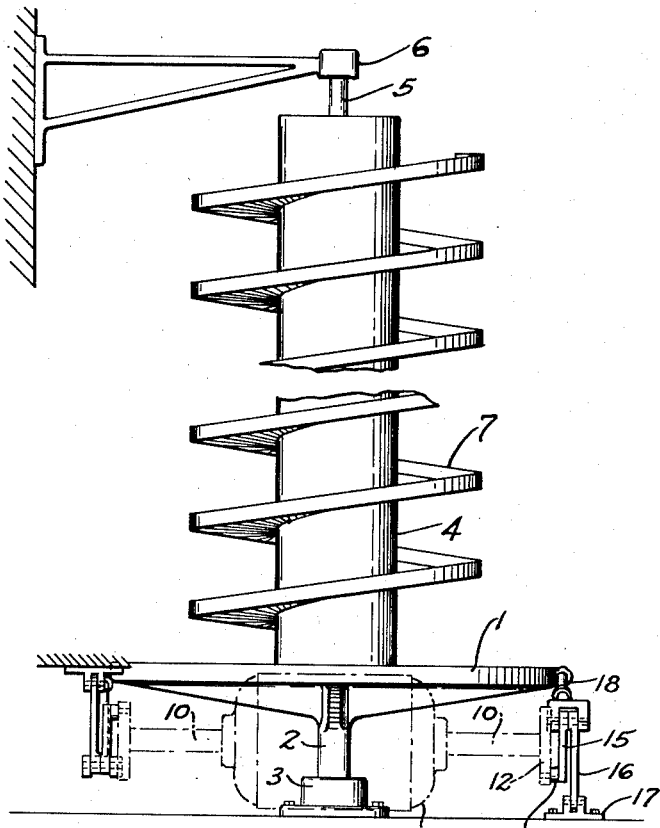
Fig. 1 is a side elevation view of a vertical spiral conveyor embodying the principles of the present invention and which may be operated to convey material supplied onto the spiral flight either upwardly or downwardly therealong, as one chooses.

Referring now more particularly to the drawings and first to Fig. 1, the structure there shown is a spiral conveyor which comprises a base 1 having a downwardly extending center shaft 2 journalled in the fixed bearing 3, a vertical tube 4 fastened to said base 1 at its lower end and having a shaft 5 at its upper end supported in a fixed bearing 6. Helically coiled around said tube 4 is a material supporting pan 7.

When it is desired to convey material, the pan 7 will be differentially oscillated about its vertical axis more rapidly in one direction than in the other, so that the pan 7 slips under the material supported thereon.

Figure 2:
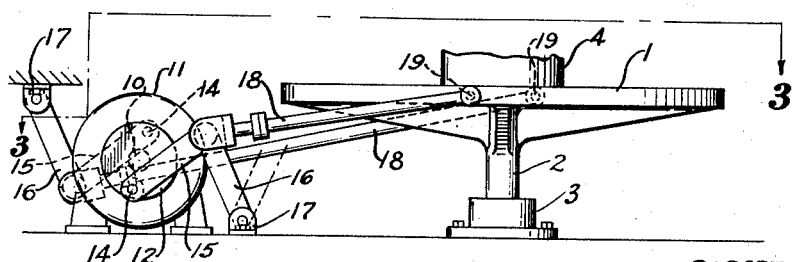
Fig. 2 is a side elevation view of the lower portion of the Fig. 1 conveyor as viewed from the righthand side of Fig. 1.

In Figs. 1, 2, and 3, there is shown one form of quick-return mechanism which has been found to perform satisfactorily the conveying action by oscillating the conveyor faster in one direction than in the other. Said mechanism is here shown as comprising a shaft 10 driven as by means of the electric motor 11, said shaft having mounted thereon a crank disc 12, to the crank pin 14 of which one end of a link 15 is pivotally secured. The other end of said link 15, in turn, is pivotally connected to the upper end of a second link 16 having its lower end pivoted in a bracket 17. Also pivotally connected to the upper ends of said links is a third link 18 which has a ball joint or like connection with a radial projection 19 of said base 1. Thus, when said shaft 10 is rotated in a clockwise direction as viewed in Fig. 2, there will be a differential rate of movement of said base 1 more rapidly during a portion of the clockwise stroke as viewed in Fig. 3 than during a portion of the counter-clockwise stroke, whereby the spiral or helical pan 7 will be slipped under the material for progressively conveying the material upwardly around said pan 7. Of course, when it is desired to convey the material downwardly around said pan 7, the differential movements will have to be reversed from that aforesaid.

Although one quick-return mechanism of the type described above may be sufficient in most instances, it is preferred to duplicate the mechanism for connection with a diametrically opposite side of the base 1 to thus balance the forces. To do this, it obviously would be possible to mount another drive shaft 10 to the righthand side of the conveyor, as viewed in Fig. 2, for connection with the side of base 1 opposite to projection 19. However, in order to avoid duplication of the drive motor 11 or of requiring reverse gearing and bearings for driving such another shaft from the existing motor 11, there is shown here a second quick-return mechanism which is turned upside down and turned end for end with respect to the mechanism just described, and which is driven by the opposite end of said shaft 10. In this case, the crank pins 14 of said mechanisms are 180° out-of-phase. Thus, while one link 18 pulls and pushes the base 1 counter-clockwise and clockwise respectively, the other link 18 pushes and pulls the base 1 in the same directions and with the same velocity and acceleration characteristics.

As is now evident, the oscillation of the conveyor does not entail any vertical components as is characteristic of prior art conveyors of the type wherein material is conveyed around in a circular path either in a horizontal plane or in an inclined plane upwardly or downwardly.

In Fig. 4, duplicate quick-return mechanisms are superimposed, each arranged to be driven by a vertically disposed drive shaft 10, the same reference numerals having been used in Fig. 4 as in Figs. 1–3 to denote the same or like parts. In this modification, the pins 19 project axially from base 1 rather than radially.

With the foregoing drive arrangements in mind, it will be apparent that it is not necessary to convey material upwardly or downwardly along a helical path, but instead the conveyor may simply comprise an oscillated annular pan or table.

In this respect, Fig. 5 illustrates a distributing table 20 having cencentric upstanding bands 21 and 22 therearound to form an annular pan 23 to which material is supplied as from a hopper 24, and as said table is differentially oscillated about the vertical axis of shaft 2, the material will be conveyed in a counter-clockwise direction therearound. At selected points around the circumference of said table 20, material on pan 23 will be discharged through swinging gates 25 and discharge chutes 26. In order to insure against overloading or overflow of the pan 23 in the event that some of the gates 25 are closed or partially closed, there is provided, just ahead of the hopper 24, a hinged level control plate 27 which, when it is lifted by the bed of conveyed material to a predetermined point, actuates a limit switch 28, and said limit switch, in turn, will be operatively connected in any well known manner to close a gate or damper or equivalent means in said hopper 24 whereby no further material will be supplied onto the table until such time that the level of the material drops down to permit the hinged plate 27 to open the limit switch 28.

In Fig. 7 there is shown a mixing or blending table 30 of the same general construction as that of Fig. 5 except that different materials are supplied to the annular pan 31 from a plurality of hoppers 32 for discharge from a common outlet or discharge chute 33. Thus, in the making of, for example, commercial fertilizer, nitrogen, potash, and phosphate may be supplied onto the pan 31 from the respective hoppers 32 at predetermined rates of flow, whereby the finally mixed product will have the desired percentages of these materials. A partition 34 across pan 31 deflects the conveyed materials to chute 33.

In Fig. 8 there is a differentially oscillated sorting table 35 having an annular pan 36 to which different parts are supplied from the chute 37 and workmen stationed around the table, as at the points marked X, will remove those parts which they may need in the performance of their assembly or other jobs. Thus, the parts may include a mixture of bolts, nuts, washers, etc. which can be readily picked from pan 36 as they move around said pan.

In Fig. 9 the table 40 is equipped with a screen 41 whereby when table 40 is differentially oscillated in the horizontal plane of the screen 41, the material loaded onto said screen at 42 will be conveyed around to discharge point 43 and while the material is thus being conveyed, the fine particles will drop through screen 41. The material which passes through the screen 41 may be collected and conveyed or may be further screened as shown in Fig. 10, for example.

In said last-mentioned Fig. 10, the material to be screened is supplied to the top screen deck 45 from the chute 46, and as the structure is differentially oscillated, the material which does not pass through the top screen deck 45 is discharged by the chute 47 after it has been conveyed around said screen. The material which passes through said top screen deck 45 is then conveyed around by the middle screen deck 48 which is of finer mesh than the top screen deck, whereupon intermediate size particles, not passing through screen 48, will be discharged by the discharge chute 49. The material which passes through the intermediate screen deck 48 may then be further screened by the bottom screen deck 50, whereby fine particles will be conveyed therearound and discharged by the discharge chute 51. The bottom deck 50 need not, of course, be a screen; but, if it is, still finer materials will pass therethrough. In this way, a granular material may be separated into several different grades according to particle size.

Figure 11:
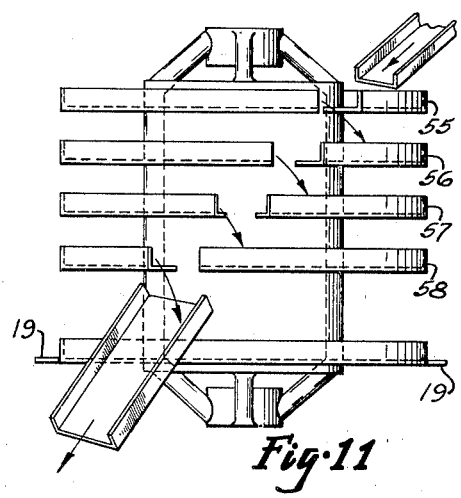
Fig. 11 is a side elevation view of a multiple deck conveyor wherein material is supplied to the top deck for conveying therearound and from which the material cascades and is thus turned over for conveying around the next deck therebelow.

In Fig. 11 is shown a multiple deck conveyor in which the annular material supporting pans 55, 56, 57 and 58 are disposed one above the others and have discharge gaps or openings circumferentially offset as shown. Thus, material supplied adjacent the gap of the top pan 55 will be conveyed therearound and will be discharged from the other end onto the next pan 56 therebelow for conveyance therearound and discharge successively to the pans 57 and 58 therebeneath. The material thus being conveyed and cascaded from the end of one pan down to the next pan will be fluffed up and turned over for thorough mixing. With a structure as shown in Fig. 11, the equivalent of hundreds of feet of conveyor pan for thorough treatment of the material supplied thereto can be accommodated in a very small space as compared with that occupied by comparable length horizontal straight troughs or pans.

Figure 12:
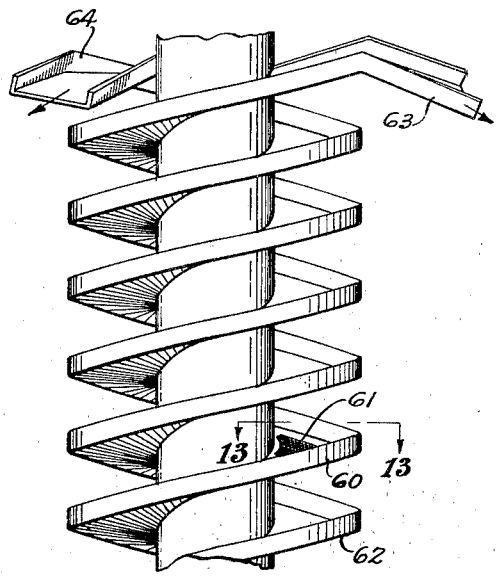
Fig. 12 is a fragmentary side elevation view of a multiple spiral flight conveyor having a corresponding number of discharge chutes.
Figure 13:
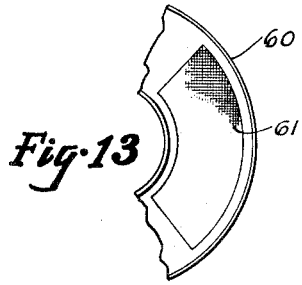
Fig. 13 is a horizontal cross-section view taken substantially along the line 13—13, Fig. 12, illustrating a screened portion of the upper flight whereby coarse materials continue to be conveyed by the upper flight, and the finer materials which pass through the screened portion are conveyed by the flight therebeneath.

In Figs. 12 and 13 is shown a multiple helical flight conveyor, of which at least a portion of the upper flight 60 is screened as at 61 so that fine material passes through for conveyance by the flight 62 therebeneath to a point of discharge 63; and, of course, the coarse material continues to be conveyed by the upper flight 60 to the point of discharge 64. Thus, a mixture of materials may be loaded onto the conveyor at the lower end of the upper flight 60 and conveyed thereby upwardly and around until the material passes over the screened portion 61 for separation into coarse and fine particles.

Figure 15:
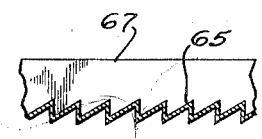
Fig. 15 is a circumferential cross-section taken substantially along the line 15—15, Fig. 14.
Figure 14:
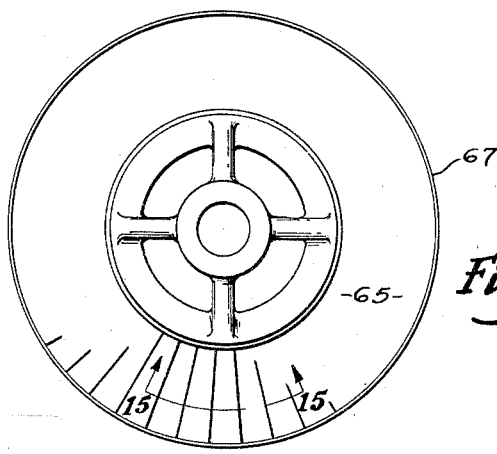
Fig. 14 is a top plan view of a conveyor having a curved material supporting surface around which the material is conveyed.

In Figs. 14 and 15 is shown a modification wherein the material supporting surface 65 of the conveying table 67 is radially stepped or serrated, as shown, so to increase the friction between the conveyed material and the material supporting surface. It has been found that certain materials such as flour, cement, and round sand are difficult to convey when using a smooth surfaced pan or table. The steps are preferably inclined at an angle less than 10° and are about 2" long at the mean radius.

As an illustrative example, the oscillating mechanism may comprise a crank disc 10 having a 4" radius throw. The link 15 may be 9" long between its pivot axes, the link 16 may be 10" long between its pivot axes and pivotally connected at its lower end at a point 11" horizontally from and 6" vertically below the axis of the drive shaft 10. Thus, when said drive mechanism is connected to the base 1 at a point 24" from the vertical axis thereof, the conveyor will be oscillated through an angle of about 20°. It has been found that, by driving the shaft 10 at a uniform speed of 75 R. P. M., most conveyable, finely divided materials may be conveyed at a rate of 25 ft. per minute upwardly around a helical flight 7 of 2 ft. inside diameter, 4 ft. outside diameter, and 1 ft. lead. With this mechanism arranged oppositely, that is, to convey downwardly, the same speed of rotation of the drive shaft 10 will effect conveying at a rate of about 100 ft. per minute. So far as horizontally disposed annular material supporting pans or tables are concerned, such materials can be conveyed at the rate of 50 ft. per minute when the drive shaft is driven at 65 R. P. M.

It will be apparent to those skilled in the art that other well known types of quick-return mechanisms may be employed in lieu of the one herein illustrated, but the one illustrated is preferred because of its simplicity and its foolproof operation. There are no sliding connections as are sometimes employed in quick-return mechanisms. In any event, regardless of the particular form of the quick-return mechanism, it can be seen that differential oscillation of the structure, whether it be a conveyor, a sorting table, a distributing table, a conveyor screen, a blending or mixing table, or any other comparable structure, is only in a horizontal plane, whereby the dead weight of the structure and the load of the material thereon need not be alternately raised and lowered and thus bearing structures are considerably simplified and the structures may be made much more rigid than otherwise, since the extra weight need not be lifted.

Insofar as screening is concerned, it is known, of course, to oscillate screens back and forth in the plane of the screen; but, to my knowledge, it has never been before the practice to differentially oscillate as herein taught. In this connection, it has been found that, with screens of 200 mesh and smaller, a much better screening effect is obtained together with conveying when the screen is moved more rapidly in one direction than in the other.

Other modes of applying the principle of the invention may be employed, change being made as regards the details described, provided the features stated in any of the following claims, or the equivalent of such, be employed.

I therefore particularly point out and distinctly claim as my invention:

1. In combination, a support, a structure carried by said support for oscillation of said structure in a substantially horizontal plane about a generally vertical axis, said structure having a material supporting surface which is curved about such axis, and drive means connected to said structure to oscillate the latter through a predetermined angle about such axis irrespective of the load of material thereon and in a substantially horizontal plane at different speeds in opposite directions such that the material on said surface slips thereon in one direction for conveying in a curved path along said surface, said drive means comprising a drive shaft, and duplicate quick return crank link mechanisms driven by said shaft and connected to said structure at diametrically opposite points thereof, one of said mechanisms being inverted and turned end for end with respect to the other of said mechanisms, so that said mechanisms may both be driven by the same shaft.

2. The combination of claim 1 wherein said material supporting surface is annular and lies in a substantially horizontal plane for conveying of material therearound.

3. The combination of claim 1 wherein said material supporting surface is helical for conveying of material therearound from one level to another level.

4. The combination of claim 1 wherein at least a portion of said material supporting surface is a screen through which particles of material smaller than the mesh of the screen drop for separation from particles of material larger than the mesh of the screen, such larger particles being conveyed around said material supporting surface.

5. The combination of claim 1 wherein said structure has a plurality of superimposed longitudinally curved material supporting surfaces around which the material is conveyed for cascading from one surface down to another surface therebelow whereby to effect aerating and fluffing up of the material thus conveyed and cascaded from one surface to another.

6. The combination of claim 1 wherein said material supporting surface is annular and lies in a substantially horizontal plane and is provided with a discharge outlet for conveyed material and wherein a plurality of material supply means loads material onto said surface at circumferentially spaced points therearound for conveying to said discharge outlet.

7. The combination of claim 1 wherein said material supporting surface is annular and lies in a substantially horizontal plane and wherein means are provided for supplying material onto said surface for conveying and wherein a plurality of discharge outlets are provided at circumferentially spaced points around said surface to discharge the material thereat as it is conveyed around said surface.

8. The combination of claim 1 wherein said structure has a plurality of superimposed material supporting surfaces of which at least portions thereof are screens whereby material supplied to the top surfaces is conveyed thereby and fine particles pass through the successive screens and are conveyed around the respective surfaces, and wherein discharge outlets are provided on said surfaces for discharge of the material conveyed thereby.

References Cited in the file of this patent
UNITED STATES PATENTS

| | | |
|---|---|---|
| 1,032,612 | Kloetzer | July 16, 1912 |
| 1,160,427 | Marcus | Nov. 16, 1915 |
| 2,658,286 | Spurlin | Nov. 10, 1953 |

FOREIGN PATENTS

| | | |
|---|---|---|
| 485,982 | Germany | Nov. 7, 1929 |